United States Patent
Wei et al.

(10) Patent No.: US 9,795,917 B2
(45) Date of Patent: Oct. 24, 2017

(54) METHOD FOR REMOVING SOX FROM GAS WITH MODIFIED POLYETHYLENE GLYCOL

(71) Applicants: BEIJING BOYUAN HENGSHENG HIGH-TECHNOLOGY CO., LTD, Beijing (CN); YONGFENG BOYUAN INDUSTRY CO. LTD., JIANGXI PROVINCE, Ji'an, Jiangxi (CN); PEKING UNIVERSITY, Beijing (CN)

(72) Inventors: Xionghui Wei, Beijing (CN); Shaoyang Sun, Beijing (CN); Meihua Zou, Beijing (CN); Jianbai Xiao, Beijing (CN); Lifang Li, Jiangxi (CN); Li Chen, Jiangxi (CN); Chun Hu, Beijing (CN); Xiangbin Li, Jiangxi (CN); Mingjin Wan, Jiangxi (CN)

(73) Assignees: BEIJING BOYUAN HENGSHENG HIGH-TECHNOLOGY CO., LTD, Beijing (CN); YONGFENG BOYUAN INDUSTRY CO. LTD., JIANGXI PROVINCE, Ji'An, Jiangxi (CN); PEKING UNIVERSITY, Beijing (CN)

( * ) Notice: Subject to any disclaimer, the term of this patent is extended or adjusted under 35 U.S.C. 154(b) by 0 days.

(21) Appl. No.: 15/021,152

(22) PCT Filed: Sep. 4, 2014

(86) PCT No.: PCT/CN2014/085924
§ 371 (c)(1),
(2) Date: Mar. 10, 2016

(87) PCT Pub. No.: WO2015/035878
PCT Pub. Date: Mar. 19, 2015

(65) Prior Publication Data
US 2016/0220946 A1    Aug. 4, 2016

(30) Foreign Application Priority Data
Sep. 10, 2013 (CN) .......................... 2013 1 0409296

(51) Int. Cl.
*B01D 53/50* (2006.01)
*B01D 53/78* (2006.01)
*B01D 53/14* (2006.01)
*C01B 17/60* (2006.01)

(52) U.S. Cl.
CPC ..... *B01D 53/1425* (2013.01); *B01D 53/1481* (2013.01); *B01D 53/1493* (2013.01); *B01D 2252/2026* (2013.01); *B01D 2257/302* (2013.01); *B01D 2258/0283* (2013.01); *C01B 17/60* (2013.01)

(58) Field of Classification Search
CPC .... B01D 53/50; B01D 53/502; B01D 53/507; B01D 53/78; B01D 2251/70; B01D 2252/2026; B01D 2257/302; B01D 2258/0283
See application file for complete search history.

(56) References Cited

U.S. PATENT DOCUMENTS

| | | | |
|---|---|---|---|
| 2,139,375 A | 12/1938 | Groll et al. | |
| 3,737,392 A | 6/1973 | Ameen | |
| 4,368,178 A | 1/1983 | Diaz | |
| 4,530,827 A * | 7/1985 | Heisel | B01D 53/523 23/295 R |
| 4,636,377 A * | 1/1987 | Heisel | C01B 17/05 423/567.1 |
| 4,659,553 A | 4/1987 | Linde | |
| 4,741,890 A * | 5/1988 | Rose | B01D 53/502 423/243.01 |
| 4,885,146 A | 12/1989 | Lassmann et al. | |
| 5,273,679 A * | 12/1993 | Hihara | B01D 53/1493 252/190 |
| 6,203,599 B1 * | 3/2001 | Schubert | B01D 53/14 95/172 |
| 8,905,742 B2 | 12/2014 | Knighton | |

FOREIGN PATENT DOCUMENTS

| | | | |
|---|---|---|---|
| CN | 1087110 A | 5/1994 | |
| CN | 1133817 A | 10/1996 | |
| CN | 1227135 A | 9/1999 | |
| CN | 1356158 A | 7/2002 | |
| CN | 1398659 A | 2/2003 | |
| CN | 1546206 A | 11/2004 | |
| CN | 101053746 A | 10/2007 | |
| CN | 101502741 A | 8/2009 | |
| CN | 103432890 A | 12/2013 | |
| DE | 2333708 A1 | 1/1975 | |
| DE | 3501118 A1 | 7/1986 | |
| EP | 0254137 A1 | 1/1988 | |
| EP | 2696970 A1 * | 2/2014 | ......... B01D 53/1425 |
| EP | 2696970 A4 * | 9/2014 | ......... B01D 53/1425 |
| EP | 3090797 A1 * | 11/2016 | ......... B01D 53/1481 |

(Continued)

OTHER PUBLICATIONS

Jian-Bin Zhang et al.; "Absorption Mechanism of SO2 in Polyethylene Glycol and Its Aqueous Solution" Chemical ngineering (China) vol. 38, No. 12, Dec. 2010.

(Continued)

*Primary Examiner* — Timothy Vanoy
(74) *Attorney, Agent, or Firm* — Novick, Kim & Lee, PLLC; Allen Xue (57) ABSTRACT

A method for removing $SO_x$ from a gas by using a modified polyethylene glycol solution to absorb the $SO_x$ in the gas. The modified polyethylene glycol solution is contacted with the gas containing $SO_x$ to absorb the $SO_x$ in the gas, wherein x=2 and/or 3, the modified polyethylene glycol is a product derived from etherifying hydroxyl groups in the molecules of ethylene glycol and/or polyethylene glycol and has a general formula: $R_1$—$(O$—$C_2H_4)_n$—$O$—$R_2$, where n is a positive integer, $R_1$ and $R_2$ are the same or different and are each independently alkyl, alkenyl, alkynyl, acyl or aryl.

9 Claims, 6 Drawing Sheets

(56) References Cited

FOREIGN PATENT DOCUMENTS

| | | |
|---|---|---|
| FR | 2532190 A1 | 3/1984 |
| JP | S62-27021 A | 2/1987 |
| JP | S6295118 A | 5/1987 |
| JP | S62-216627 A | 9/1987 |
| JP | H06228573 A | 8/1994 |
| JP | 06-279007 A | 10/1994 |
| RU | 2070423 C1 | 12/1996 |
| SU | 655410 A1 | 4/1979 |
| SU | 927282 A1 | 5/1982 |
| SU | 1611411 A1 | 12/1990 |
| WO | 8400952 A1 | 3/1984 |
| WO | 9007467 A1 | 7/1990 |
| WO | 03011432 A1 | 2/2003 |
| WO | WO 2012139219 A1 * 10/2012 ......... B01D 53/1425 |

OTHER PUBLICATIONS

Bin Ma, "Development of Amisol Process", Coal Chemical Industry, 1994, vol. 3, pp. 35-38.
Wenbin Dai et al, "Solubilities of Gases in Rectisol Process", Computer and Applied Chemistry, vol. 11, No. 1, Feb. 1994, pp. 44-51.
Xionghui Wei et al., "Desulfurization of Gases with a Buffering Solution of Basic Ironic Salts", Journal of Chemical Industry and Engineering, vol. 49, No. 1, Feb. 1998, pp. 48-58.
European Patent Office, Extended European Search Report for EP application No. 14843772.6 dated Apr. 18, 2017.
Kurt A.G. Schmidt et al., "Solubility of Sulphur Dioxide in Mixed Polyethylene Glycol Dimethyl Ethers", Canadian Journal of Chemical Engineering, vol. 79, Dec. 2001, p. 946-960.

* cited by examiner

METHOD FOR REMOVING SOX FROM GAS WITH MODIFIED POLYETHYLENE GLYCOL

TECHNICAL FIELD

This invention relates to a purification method of flue gas, waste gas containing sulfur, and/or industrial raw material gas, in particular to a method for removing $SO_x$ (x=2 and/or 3) from flue gas, waste gas containing $SO_x$, and/or industrial raw material gas.

BACKGROUND

The consumption and discharge of the flue gas, industrial raw material gas containing sulfur and other waste gases are increasing day by day due to the rapid development of industries. Discharge of waste gas containing sulfur has caused serious environmental pollutions, such as the formation of acid rain, acid corrosion of construction, respiratory diseases and skin diseases, etc., which are directly harmful to human health. Over years, scientific and technological researchers in various countries have intensively studied the desulfurization process of the flue gas, industrial raw material gas containing sulfur and other waste gases and accumulated a lot of research data. The desulfurization of the flue gas, industrial raw material gas containing sulfur and other waste gases has increasingly received much attention with the increased environmental awareness. However, so far we have not made breakthrough progresses in the desulfurization techniques of the flue gas, industrial raw material gas containing sulfur and other waste gases. The desulfurization of the flue gas, industrial raw material gas containing sulfur and other waste gases is still a challenging problem.

The existing desulfurization processes of the flue gas, industrial raw material gas containing sulfur and other waste gases mainly include wet desulfurization and dry desulfurization. The wet desulfurization includes water washing method, limestone and limewater method, alkali metal solution method, alkaline solution method, ammonia method and alcohol amine method. The dry desulfurization includes iron oxide method, zinc oxide method, manganese oxide method, cobalt oxide method, chromium oxide method, molybdenum oxide method, and activated carbon method. The water washing method, limestone and limewater method are used in China. The limestone and limewater method, alkali metal solution method, alkaline solution method, ammonia method and alcohol amine method are widely used in developed countries. The water washing method has the disadvantages that a great deal of water is consumed, the used water cannot be recycled, serious secondary pollution has been caused by the discharge of waste water containing sulfur and the desulfurization effect is poor. The limestone and limewater method is better than the water washing method. However, the limestone and limewater method has the disadvantages that more solid wastes such as calcium sulfate, calcium sulfite and calcium carbonate are generated, a great deal of limestone and calcium oxide are consumed, the equipment is huge, the investment is large, and the equipment is inclined to be clogged due to the generated solid precipitates during the absorbing process. Further, calcium hydroxide is preferentially reacted with carbon dioxide during the absorbing process due to the limestone and calcium hydroxide having small solubilities in water, and then with sulfur oxides, the desulfurization effect of limewater method is not desirable. In addition, the limewater method has the disadvantages of more sewage discharge and serious secondary pollution. The alkali metal solution method, alkaline solution method, ammonia method and alcohol amine method are mainly used for the desulfurization of flue gas with relatively high content of sulfur dioxide (tail gases of smelting such as steel smelting and copper smelting, in which the sulfur dioxide content can be up to 8% or more), and the removed sulfur dioxide is recovered. These methods are not suitable for the desulfurization of normal flue gas due to the relatively high requirements for the techniques, relatively high energy consumption and high demand for material of the equipment. Meanwhile, corrosion to the equipment is dramatically serious for all the currently used desulfurization processes of the flue gas, industrial raw material gas containing sulfur and other waste gases.

So far, various gases are seldom subjected to desulfurization treatment before being discharged into atmosphere. The gases still have relatively high content of sulfur even if they are subjected to desulfurization treatment. The existing desulfurization methods such as HiPure method, Benfield method, G-V method, A.D.A method, water washing method, limestone and limewater method, alkali metal solution method, alkaline solution method, ammonia method, alcohol amine method, tannin extract method, and sulfolane method, as well as the dry desulfurization methods such as iron oxide method, zinc oxide method, manganese oxide method, cobalt oxide method, chromium oxide method, molybdenum oxide method, and activated carbon method are mainly used as primary desulfurization methods for removing hydrogen sulfide from industrial raw material gases, but are not commonly used for removing hydrogen sulfide from general gases. The main reasons for this are that these desulfurization methods have low desulfurization efficiency, high operating costs, high equipment investments, serious corrosion to equipment, undesirable desulfurization effects, and poor removal rate for organic sulfur[1-3]. The desulfurization technique by low-temperature methanol[4] is a method of physically adsorbing hydrogen sulfide, carbonyl sulfur, carbon disulfide and carbon dioxide and is commonly used for decarbonization and desulfurization of raw material gases in modern large-scale chemical enterprise. However, since methanol has low boiling point, is volatile, and has high saturated vapor pressure, it is usually required to operate under high pressure and at low temperature (less than −10° C.) and thus the energy consumption is high, methanol loss is serious, the process is complicated, the operation is tedious, and the comprehensive operating expense is high. The normal-temperature methanol method[5] is a method of absorbing hydrogen sulfide, carbonyl sulfur, carbon disulfide and carbon dioxide in gas by a mixed solution of 60% methanol and 40% diethanolamine and then releasing hydrogen sulfide, carbonyl sulfur, carbon disulfide and carbon dioxide by heating and reducing pressure. However, since methanol has low boiling point, is volatile, and has high saturated vapor pressure, the released gas contains a great deal of methanol, thereby resulting in variable solution composition and serious methanol loss. In addition, the chemical stability of the solution is poor for the reasons that the diethanolamine is prone to oxidative decomposition after being exposed to daylight and air. Therefore, after the hydrogen sulfide, carbonyl sulfur, carbon disulfide and carbon dioxide are regenerated and released by heating and reducing pressure when adopting solution regenerating method, Claus method may have to be used to convert the released gases containing sulfur into sulfur. This leads to high energy consumption, serious loss of methanol and diethanolamine, complicated process, tedious operation, and high comprehensive operating expense. The methods described above are mainly used for removing organic sulfur such as hydrogen sulfide, carbonyl sulfur, and carbon disulfide in gas, but not used for removing $SO_2$ and/or $SO_3$ in gas.

An urotropine aqueous solution containing glycerol (glycerin) is proposed to absorb $SO_2$ in flue gas[6]. However, it is found that urotropine tends to be oxidative decomposed by oxygen gas present in the flue gas after contacting with it in practical experiment, causing the chemical property of the solution to be unstable. In addition, urotropine as a product of chemical and medical is expensive and is not readily available. Therefore, this method fails to be widely used due to high operating costs and unstable desulfurization performance.

A buffer solution of acetic acid and ammonia containing $Fe^{2+}$ and $Fe^{3+}$ [7-9] has been used for desulfurization of semi-water gas, which has relatively high desulfurization efficiency and relatively low corrosion. However, the solution is unstable due to ionic effect and salt effect. In the method of iron-alkaline solution catalyzed decarbonization, desulfurization, and decyanation from gas, an aqueous solution of alkaline substance containing iron ions is used for absorbing the sulfur in the gas. This method can be used for removing various types of sulfur and has better desulfurization effect than the conventional wet desulfurization method for the gas having low sulfur content. However, the iron ions are unstable in the alkaline solution and a large amount of precipitate of ferric hydroxide or ferrous hydroxide will be produced. Simultaneously, a large amount of precipitate of ferric sulfide or ferrous sulfide will be produced when the iron-alkaline solution is contacted with gas containing sulfide. Thus the content of iron ions in the solution decreases rapidly and the desulfurization effect significantly reduces. In addition, the phenomenon of clogging the desulfurization tower will occur. Therefore, this method is not suitable for the desulfurization of gas having high sulfur content[10]. In order to improve this situation, we attempt to carry out the desulfurization by "iron-alkaline solution" containing microorganisms under normal pressure or increased pressure and a good desulfurization effect is achieved[11]. Furthermore, it is suggested to absorb hydrogen sulfide by ethylene glycol, or ethylene glycol ester, or diethylene glycol monomethyl ether solution. Then, sulfur dioxide gas is blown into the organic solution with absorbed hydrogen sulfide, and hydrogen sulfide is reacted with sulfur dioxide to produce sulfur so as to allow the organic solution to be regenerated and recycled for use[12-14]. Although the method for regenerating the ethylene glycol solution containing hydrogen sulfide by sulfur dioxide is very simple, sulfur dioxide is limited in supply and is not readily available. In addition, it is required for special device and safety measure during transportation. Therefore, this method has disadvantages that the operating cost is high and the safety measure is strict. It is proposed to absorb hydrogen sulfide, organic sulfur and water in natural gas or other gases by ethylene glycol solution, or a mixed solution of ethylene glycol and alkanolamine, or a mixed solution of ethylene glycol, alkanolamine, and sodium carbonate, or ethylene glycol dimethyl ether or diethanol dimethyl ether solution, or a mixed aqueous solution of diethylamine, diethylene glycol, triethylene glycol and triethylene glycol methyl ether, or a mixed solution of amine and acetaldehyde, or a mixed aqueous solution of diethylene glycol monomethyl ether and ferric nitrilotriacetate[15-23]. However, currently these processes described above are only used in the desulfurization of industrial raw material gas in large scale to remove hydrogen sulfide, carbonyl sulfur, and carbon disulfide, but not used in the desulfurization of flue gas and other waste gases to remove $SO_x$ (including sulfur dioxide and/or sulfur trioxide).

Our earlier patent techniques of "Method for removing $SO_x$ from gas by polyethylene glycol (Patent No. ZL200910009058.1)" and "Method for removing $SO_x$ from flue gas by ethylene glycol (Patent No. ZL200710110446.X)" have good desulfurization effects during industrialized production tests. However, a small amount of the ethylene glycol and polyethylene glycol solutions will deteriorate during regeneration by heating, which will increase the operating costs and affect desulfurization efficiencies. It has been found that sulfur dioxide or sulfur trioxide mainly interacts with hydroxyl groups in the molecules of ethylene glycol or polyethylene glycol and simultaneously is weakly bound to ether linkage in polyethylene glycol when interacting with ethylene glycol or polyethylene glycol. The interacting mechanisms are as follows:

Taking ethylene glycol and diethylene glycol as examples only, the chemical reactions are as follows:

The following weak bindings will occur besides the above main reactions:

The following side reactions will occur during regeneration by heating:

From our current research results, it can be seen that these side reactions may be irreversible reactions. That is to say, there is so far no way to reverse these side reactions. The resulting sulfinates and sulfonates cannot be regenerated to release sulfur dioxide or sulfur trioxide. The capability of the solution to absorb sulfur will decrease as the amount of sulfinates and sulfonates in the solution increases. The solution deteriorates, thereby damaging the system and even making the system unworkable.

REFERENCES

[1] Benson, H. E. Parrish, R. W. (1974) HiPure Process Removes $CO_2/H_2S$. Hydrocarbon Processing, April. 81-82.
[2] Jenett, E. (1962), Giammarco-Vetrocoke Process. The Oil and Gas Journal. April 30, 72-79.
[3] F. C. Riesenfeld, A. L. Kohl, translated by Yusheng Shen, <Gas Purification>, Beijing, China Architecture & Building Press, 1982.
[4] Wenbin Dai, Hongqing Tang, <Computer and Applied Chemistry>, 1994, 11 (1), P44-51.
[5] Bin Ma, <Coal Chemical Industry>, 1994, No. 68, P35-38.
[6] Zh. Prikl. Khim. (S.-Peterburg), 66(10), 2383-2385 (Russian), 1993.
[7] Xionghui Wei, Qianhuan Dai, Zhongming Chen, Kesheng Shao, Chending Zhang, (1998) Principle of Desulfurization by Buffer Aqueous Solution of Alkaline Iron Salt, Journal of Chemical Engineering, 49(1), 48-58.
[8] Xionghui Wei, (1994) Novel method of Desulfurization and Deoxygenation for Semi-water Gas, Chinese patent publication No. 1087110.
[9] Xionghui Wei, (1996) Decarbonization and Desulfurization Method by Pressurized Iron-alkaline Solution, Chinese patent publication No. 1133817.
[10] Xionghui Wei, Meihua Zou, Fenghui Wei, (1999) Decarbonization, Desulfurization and Decyanation Method for Gas by Iron-alkaline Solution via Catalysis, Chinese patent No. ZL99100596.1.
[11] Xionghui Wei, (2002) Desulfurization Method for Gas by Biochemical Iron-alkaline Solution via Catalysis, Chinese patent No. ZL02130605.2.
[12] Galeeva R. G., Kamalov Kh. S., Aminov M. Kh., Gafiatullin R. R., Mitina A. P., Bakhshijan D. Ts., Safin G. R., Levanov V. V., Installation for Complete purification of Petroleum and Nattural Gases, RU2070423C1.
[13] Biedermann, Jean-Michel, Process for Eliminating Hydrogen Sulphide Contained in Gas Mixture, PCT/FR83/00174.
[14] Biedermann, Jean-Michel, etc., Process for Eliminating Hydrogen Sulphide Contained in Gas Mixture, FR2532190-A1.
[15] Muraoka Hiromitsu, Dehydration Method by Ethylene Glycol, JP62-95118A.
[16] German Patent, Dehydration Method by Ethylene Glycol, DT2333708A1.
[17] The Former Soviet Union Patent, SU1611411A1.
[18] Komuro Takeyong, JP6-228573A.
[19] The Former Soviet Union Patent, SU655410A.
[20] WYSCHOFSKY Michael, HOBERG Dirk, Method for the Separation of Gaseous Components from Technical Gases by Means of Ethylene Glycol Dimethyl Ethers at Low Temperatures, WO03011432A1(PCT/EP02/07915).
[21] The Former Soviet Union Patent, SU927282B.
[22] DILLON Edward Thomas, Composition and Method for Sweetening Hydrocarbons, WO9007467A1(PCT/US89/05742).
ZAIDA Diaz, Process for the Removal of $H_2S$ and $CO_2$ from Gaseous Streams, U.S. Pat. No. 4,368,178.

SUMMARY OF INVENTION

An object of the invention is to provide a method for absorbing $SO_x$ (x=2 and/or 3) in a gas by modified polyethylene glycol as a solution (hereinafter, simply referred to as "a modified polyethylene glycol solution") (hereinafter, the method is simply referred to as "a desulfurization method by modified polyethylene glycol"), so as to address the deficiencies described above in our earlier patents of "Method for removing $SO_x$ from gas by polyethylene glycol (Patent No. ZL200910009058.1)" and "Method for removing $SO_x$ from flue gas by ethylene glycol (Patent No. ZL200710110446.X)", thereby avoiding the generation of sulfinates and sulfonates.

According to the invention, ethylene glycol and polyethylene glycol are modified. The modification is performed by etherifying hydroxyl groups in the molecules of ethylene glycol or polyethylene glycol. The molecular formulas of the etherified ethylene glycol and polyethylene glycol are as follows:

| | |
|---|---|
|  $R_1$—O—$C_2H_4$—O—$R_2$ | etherified ethylene glycol; |
|  $R_1$—O—$C_2H_4$—O—$C_2H_4$—O—$R_2$ | etherified polyethylene glycol having a polymerization degree of 2; |
|  $R_1$—O—$C_2H_4$—O—$C_2H_4$—O—$C_2H_4$—O—$R_2$ | etherified polyethylene glycol having a polymerization degree of 3; |

| | |
|---|---|
| R₁—O—C₂H₄—O—C₂H₄—O—C₂H₄—O—C₂H₄—O—R₂ | etherified polyethylene glycol having a polymerization degree of 4; |
| . . . | and so on. |

That is, the molecular formula is $R_1$—$(O$—$C_2H_4)_n$—$O$—$R_2$, wherein n is a positive integer.

In the above molecular formulas, the substituents $R_1$ and $R_2$ are the same or different and are each independently alkyl, alkenyl, alkynyl, acyl or aryl.

The alkyl described above can be linear or branched alkyl, preferably C1-C18 linear or branched alkyl, more preferably C1-C4 linear or branched alkyl, for example methyl, ethyl, propyl, isopropyl, and so on.

The alkenyl described above can be linear or branched alkenyl, preferably C2-C18 linear or branched alkenyl, more preferably C2-C4 linear or branched alkenyl, for example vinyl, propenyl, and so on.

The alkynyl described above can be linear or branched alkynyl, preferably C2-C18 linear or branched alkynyl, more preferably C2-C4 linear or branched alkynyl, for example ethynyl, propynyl, and so on.

The acyl described above can be represented by wherein R represents hydrocarbyl, which can be alkyl, alkenyl or alkynyl, preferably C1-C16 linear or branched alkyl, C2-C16 linear or branched alkenyl, or C2-C16 linear or branched alkynyl, for example formyl, acetyl, propionyl, acryloyl, butenoyl, propynoyl, butynoyl, and so on.

The aryl described above is preferably phenyl and substituted phenyl. The substituted phenyl can be monosubstituted or polysubstituted phenyl, wherein chain hydrocarbyl-substituted phenyl is for example methylphenyl, dimethylphenyl, trimethylphenyl, tetramethylphenyl, pentamethylphenyl and the like; ethylphenyl, diethylphenyl, triethylphenyl, tetraethylphenyl, pentaethylphenyl and the like; propylphenyl, dipropylphenyl, tripropylphenyl, tetrapropylphenyl, pentapropylphenyl and the like; propenylphenyl, butenylphenyl and the like; propynylphenyl, butynylphenyl and the like.

In the desulfurization method by modified polyethylene glycol according to the present invention, first, the etherified modified polyethylene glycol solution is used to absorb $SO_x$ (x=2 and/or 3) in the gas, and then the modified polyethylene glycol solution with absorbed $SO_x$ is regenerated by one or more of heating method, vacuum method, gas stripping method, ultrasonic method, microwave method, and radiation method, and the regenerated modified polyethylene glycol solution is recycled for use. When the regenerated modified polyethylene glycol solution has relatively high water content and the desulfurization effects are influenced, it is needed to remove water from the modified polyethylene glycol solution. The methods for removing water include distillation method by heating, absorption method with water absorbent or combination thereof. The modified polyethylene glycol solution with water removed is recycled for use.

According to the desulfurization method by modified polyethylene glycol of the present invention, there are no special requirements for the total content of $SO_x$ in the gas containing sulfur before desulfurization. However, in order to achieve a better desulfurization effect, it is preferred that the total content of $SO_x$ in the gas containing sulfur should be less than 99.9% (volume percent).

In the desulfurization method by modified polyethylene glycol according to the present invention, there are no strict restrictions on processing conditions. However, it is preferred that the absorption is performed under a normal or increased pressure and the absorption temperature is preferably −20-80° C. Next, the modified polyethylene glycol solution with absorbed $SO_x$ is regenerated by one or more of heating method, vacuum method, gas stripping method, ultrasonic method, microwave method, and radiation method. Preferably, the regeneration temperature is 0 to 300° C.

The modified polyethylene glycol solution is a liquid fluid mainly containing modified polyethylene glycol, in which the modified polyethylene glycol has a mass percent content of ≥80%; and water has a mass percent content of <20%.

In the desulfurization method by modified polyethylene glycol according to the present invention, when the modified polyethylene glycol solution with absorbed $SO_x$ is regenerated by one or more of heating method, vacuum method, gas stripping method, ultrasonic method, microwave method, and radiation method, sulfur dioxide and/or sulfur trioxide are byproducts.

The fundamental principle of the invention is as follows:

For better explaining the principle of the present invention, a modified polyethylene glycol having a polymerization degree of 2 is exemplified. However, it does not mean that the modified polyethylene glycol solution according to the present invention is limited to the modified polyethylene glycol having a polymerization degree of 2. Further, it cannot be construed as limiting the claims of the present invention.

The following absorption reactions take place when a flue gas or another gas containing $SO_x$ is contacted with the modified polyethylene glycol solution:

The modified polyethylene glycol solution with absorbed sulfur dioxide and sulfur trioxide is converted into a rich liquor, flows out from the bottom of desulfurization tower and flows into regenerator to be regenerated by one or more of heating method, vacuum method, gas stripping method, ultrasonic method, microwave method, and radiation method, releasing sulfur dioxide and/or sulfur trioxide of high purity. The following regeneration reactions will take place in the regenerator for the rich liquor.

It is found through experimental study that the capability of the modified polyethylene glycol solution to absorb sulfur will significantly decrease when the modified polyethylene glycol solution contains water. Therefore, the water contained in the modified polyethylene glycol solution should be removed as much as possible. The lower the water content is, the better the desulfurization effect is. However, in practical desulfurization, it is impossible to completely remove the water from the modified polyethylene glycol solution. In order to reduce the cost of water removal reasonably while ensuring that the modified polyethylene glycol solution can absorb sulfur effectively, the mass percent content of water in the modified polyethylene glycol solution can be decreased to 20% or less.

The regenerated modified polyethylene glycol solution (hereinafter, simply referred to as "desulfurization solution") is recycled for use.

In order to achieve the fundamental principle described above, two processes are designed. The first process is a desulfurization and absorption process, and the second process is a regeneration process of the desulfurization solution. The regeneration methods used in the regeneration process of the desulfurization solution include heating method, vacuum method, gas stripping method, ultrasonic method, microwave method, and radiation method.

Figure 1:
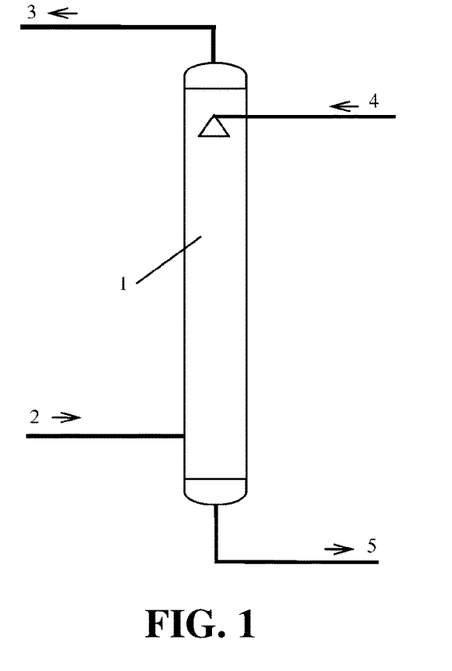
FIG. 1 is a schematic diagram of desulfurization and absorption process.

The first process is described as follows: The desulfurization and absorption process can be an atmospheric absorption process or a pressurized absorption process. The desulfurization and absorption process is shown in FIG. 1. The desulfurization and absorption process takes place in the desulfurization tower. Usually, the gas containing $SO_x$ is fed into the desulfurization tower from the bottom of the desulfurization tower. The regenerated desulfurization solution (usually referred to as "lean liquor") is charged into the desulfurization tower from the top of the desulfurization tower. In the desulfurization tower, the gas containing $SO_x$ is contacted with the desulfurization solution counter-currently and the $SO_x$ in the gas is absorbed by the desulfurization solution. Then, the gas with $SO_x$ removed is discharged out from the top of the desulfurization tower. The desulfurization solution with absorbed $SO_x$ in the gas is converted into "rich liquor". The "rich liquor" is discharged out from the bottom of the desulfurization tower and then flows to the regeneration process. Alternatively, both the gas and the desulfurization solution can be charged into the desulfurization tower from the top of the desulfurization tower during the absorption process. The absorption is carried out concurrently in the desulfurization tower.

The second process is the regeneration process of the desulfurization solution. The regeneration methods used include heating method, vacuum method, gas stripping method, ultrasonic method, microwave method, and radiation method.

Figure 2:
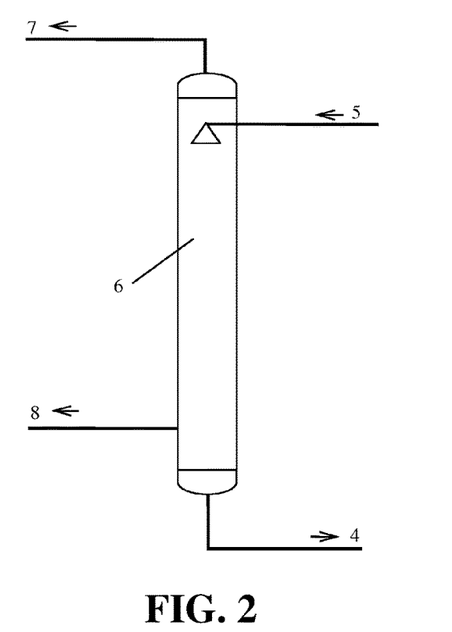
FIG. 2 is a schematic diagram of desulfurization solution regeneration by heating method.

The schematic flow diagram of the regeneration by heating method is shown in FIG. 2. The desulfurization "rich liquor" with absorbed $SO_x$ is charged into a heating-regenerator and regenerated by heating to release $SO_2$ and/or $SO_3$. The regenerated desulfurization solution by heating is generally referred to as desulfurization "semi-lean liquor" or "lean liquor". The "semi-lean liquor" or "lean liquor" can be transferred directly to the desulfurization and absorption process to be used repeatedly. Alternatively, it can be transferred to another regenerator for further regeneration by another regeneration method and then transferred to the desulfurization and absorption process to be used repeatedly.

Figure 3:
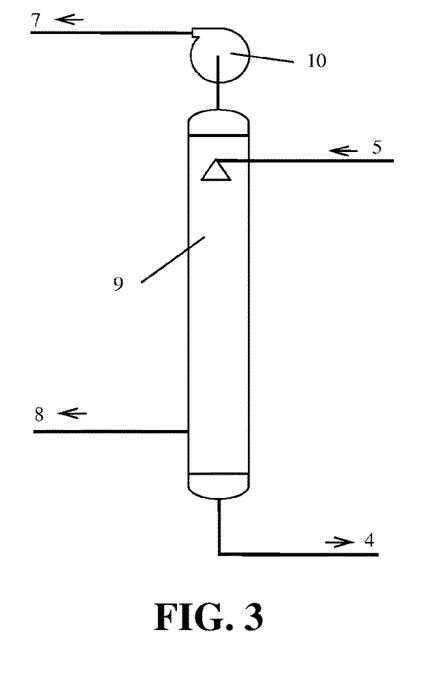
FIG. 3 is a schematic diagram of desulfurization solution regeneration by vacuum method.

The schematic flow diagram of the regeneration by vacuum method is shown in FIG. 3. The desulfurization "rich liquor" with absorbed $SO_x$ is charged into a vacuum regenerator and regenerated by evacuation to release $SO_2$ and/or $SO_3$. The regenerated desulfurization solution by evacuation is generally referred to as desulfurization "semi-lean liquor" or "lean liquor". The "semi-lean liquor" or "lean liquor" can be transferred directly to the desulfurization and absorption process to be used repeatedly. Alternatively, it can be transferred to another regenerator for further regeneration by another regeneration method and then transferred to the desulfurization and absorption process to be used repeatedly.

Figure 4:
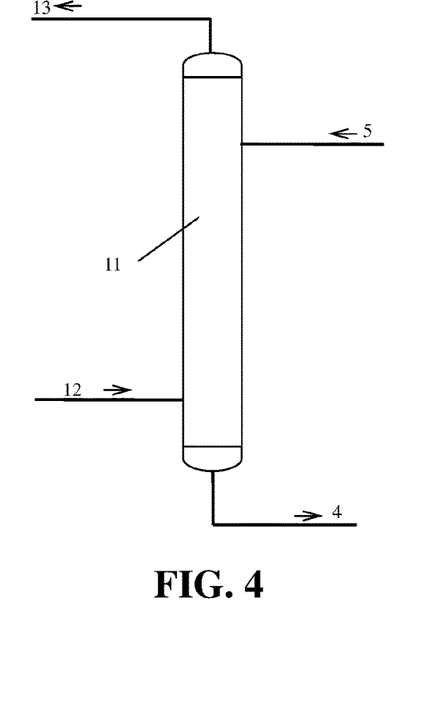
FIG. 4 is a schematic diagram of desulfurization solution regeneration by gas stripping method.

The schematic flow diagram of the regeneration by gas stripping method is shown in FIG. 4. The desulfurization "rich liquor" with absorbed $SO_x$ is charged into a gas stripping-regenerator. An inert gas (such as nitrogen, argon, and water vapour, etc.) is fed from the bottom of the gas stripping-regenerator. $SO_2$ and/or $SO_3$ are carried out from the desulfurization "rich liquor" by the inert gas, and the desulfurization solution is regenerated. The regenerated desulfurization solution by gas stripping is generally referred to as desulfurization "semi-lean liquor" or "lean liquor". The "semi-lean liquor" or "lean liquor" can be transferred directly to the desulfurization and absorption process to be used repeatedly. Alternatively, it can be transferred to another regenerator for further regeneration by another regeneration method and then transferred to the desulfurization and absorption process to be used repeatedly.

Figure 5:
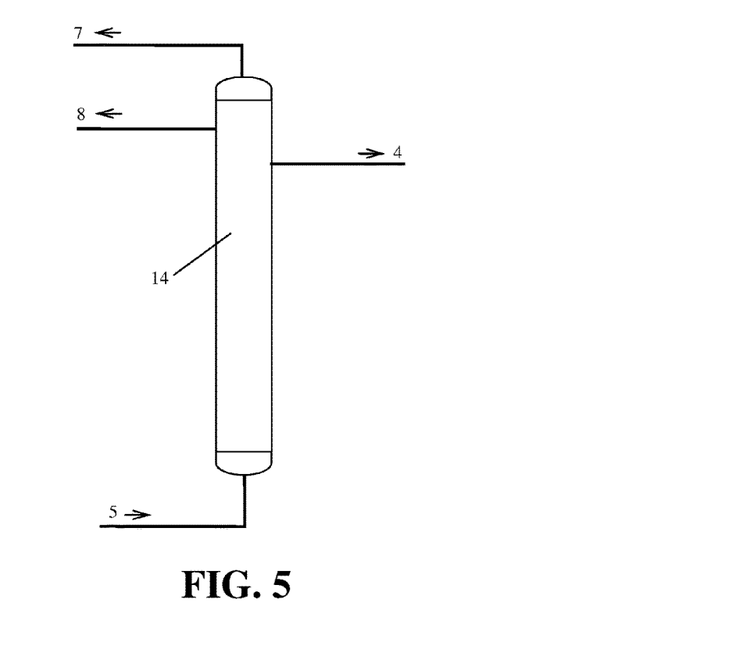
FIG. 5 is a schematic diagram of desulfurization solution regeneration by ultrasonic method, and/or microwave method, and/or radiation method.
Figure 6:
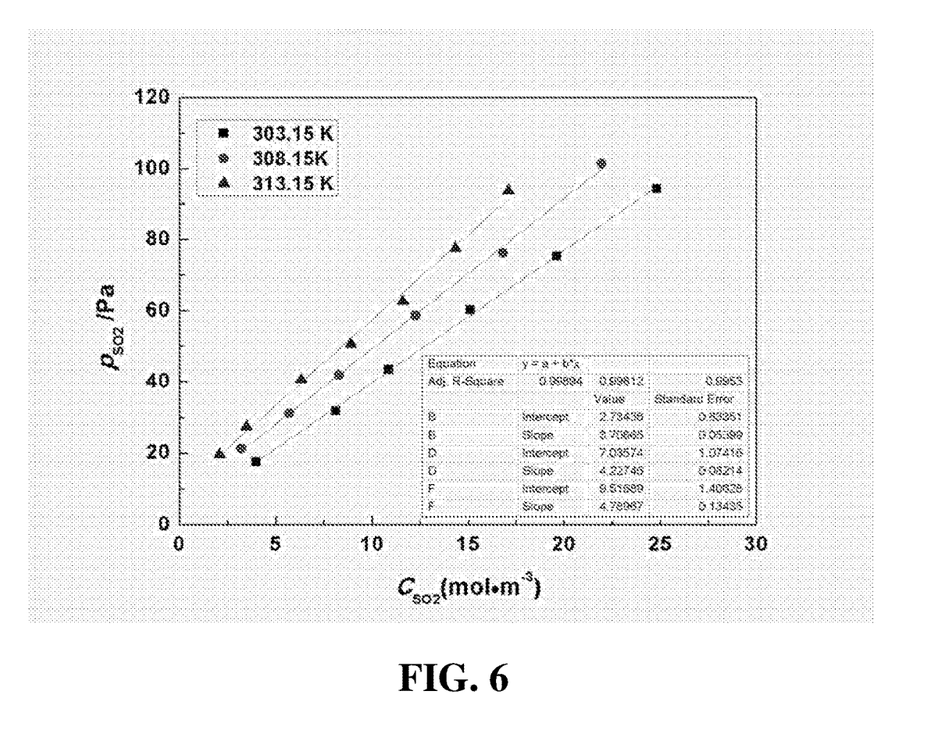
FIG. 6 is a gas-liquid equilibrium diagram for absorption of ethylene glycol dimethyl ether (EGDME) solution and a mixed gas of sulfur dioxide and nitrogen at the temperature of 303.15 K, 308.15 K and 313.15 K under the pressure of 122.66 kPa.
Figure 7:
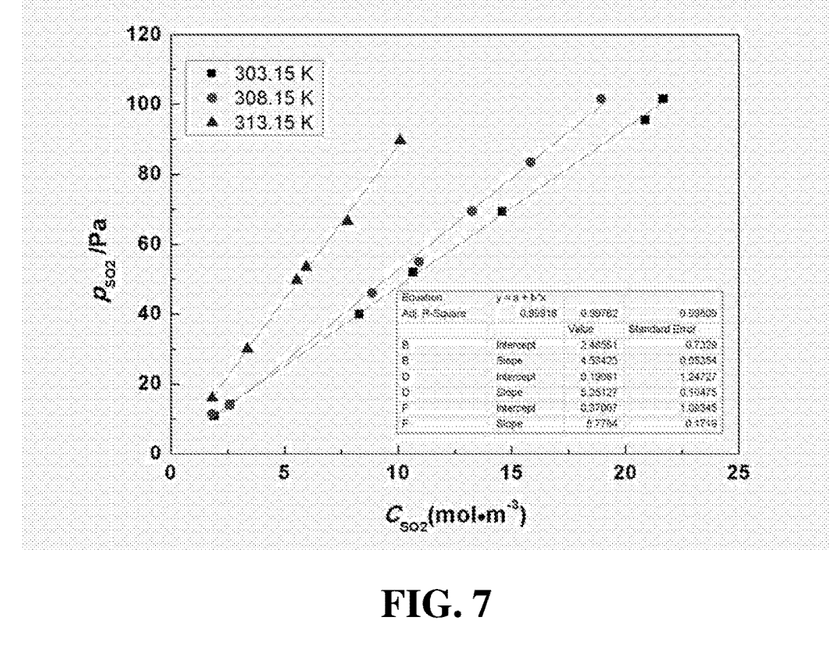
FIG. 7 is a gas-liquid equilibrium diagram for absorption of diethylene glycol dimethyl ether (DEGDME) solution and a mixed gas of sulfur dioxide and nitrogen at the temperature of 303.15 K, 308.15 K and 313.15 K under the pressure of 122.66 kPa.
Figure 8:
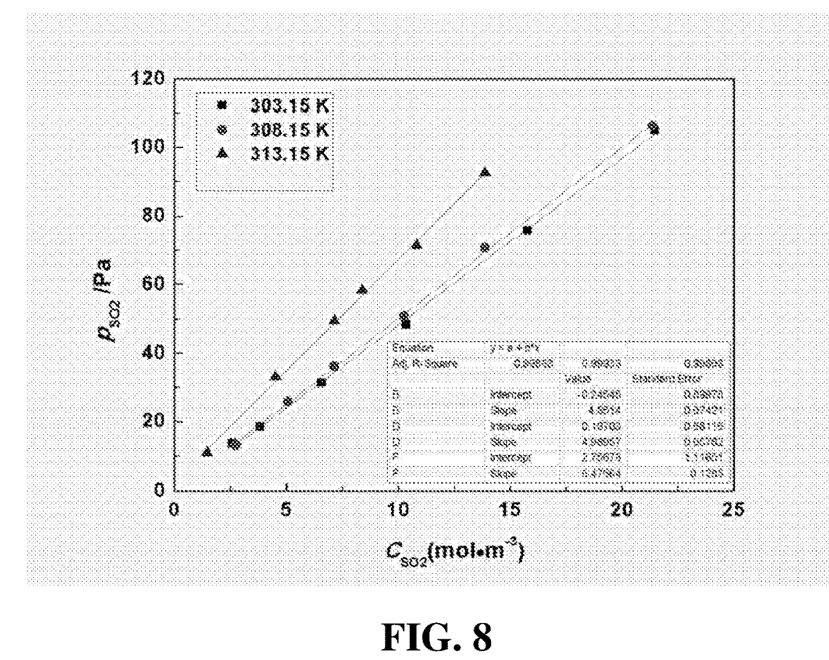
FIG. 8 is a gas-liquid equilibrium diagram for absorption of triethylene glycol dimethyl ether (TriEGDME) solution and a mixed gas of sulfur dioxide and nitrogen at the temperature of 303.15 K, 308.15 K and 313.15 K under the pressure of 122.66 kPa.
Figure 9:
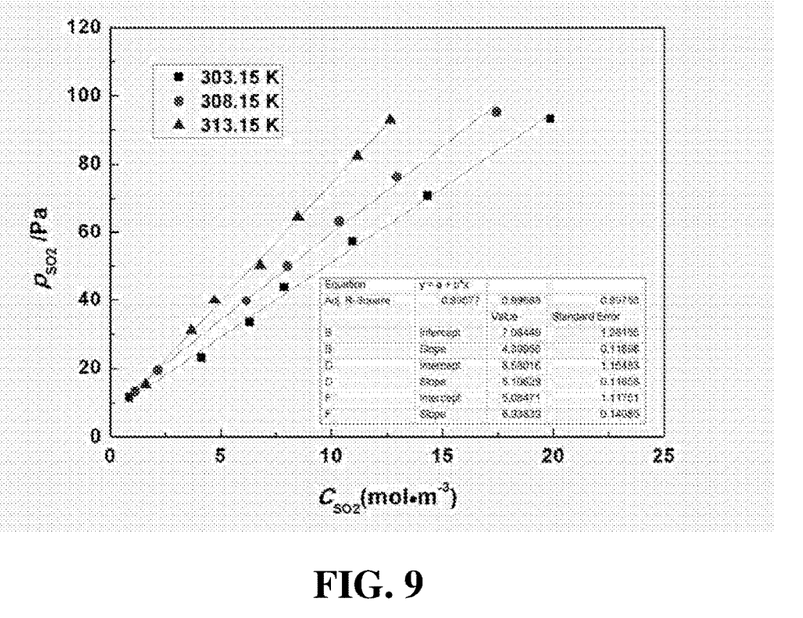
FIG. 9 is a gas-liquid equilibrium diagram for absorption of tetraethylene glycol dimethyl ether (TetraEGDME) solution and a mixed gas of sulfur dioxide and nitrogen at the temperature of 303.15 K, 308.15 K and 313.15 K under the pressure of 122.66 kPa.
Figure 10:
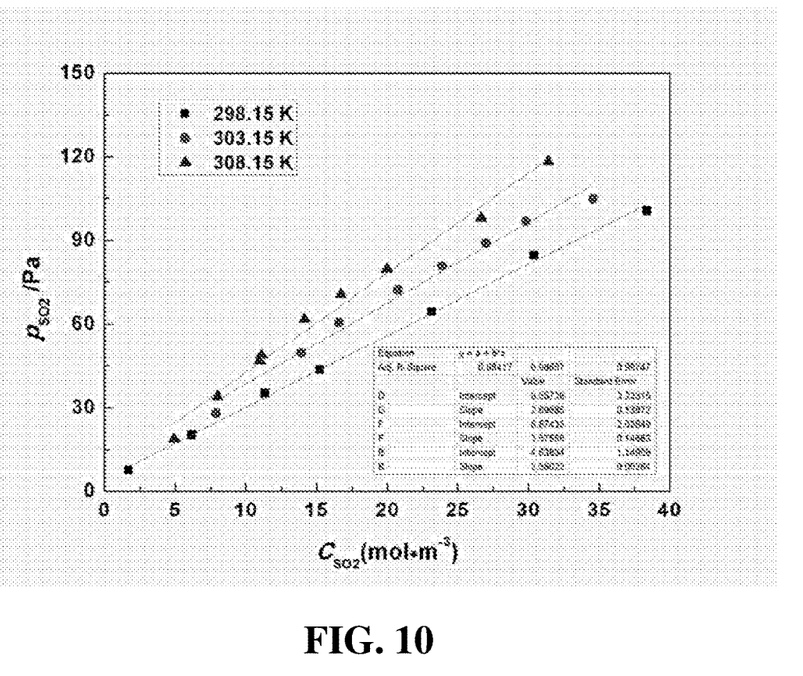
FIG. 10 is a gas-liquid equilibrium diagram for absorption of dioxane (1,4-Dioxane) solution and a mixed gas of sulfur dioxide and nitrogen at the temperature of 303.15 K, 308.15 K and 313.15 K under the pressure of 122.66 kPa.
Figure 11:
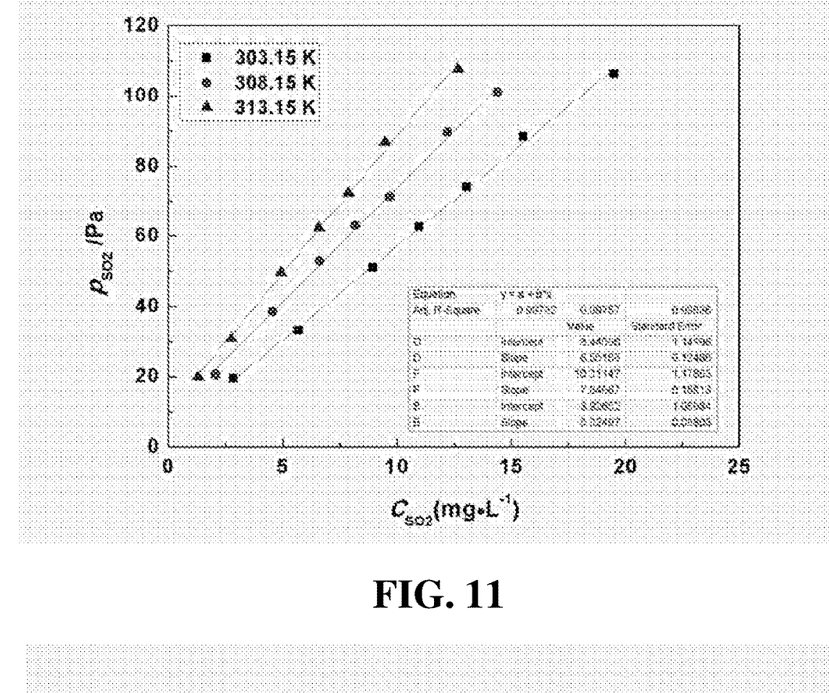
FIG. 11 is a gas-liquid equilibrium diagram for absorption of ethylene glycol methyl ether (EGME) solution and a mixed gas of sulfur dioxide and nitrogen at the temperature of 303.15 K, 308.15 K and 313.15 K under the pressure of 122.66 kPa.
Figure 12:
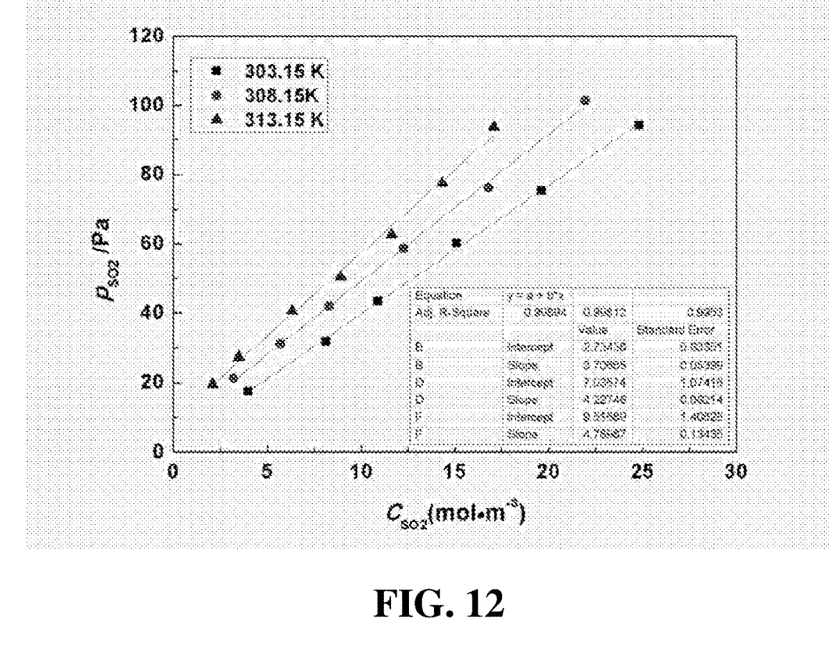
FIG. 12 is a gas-liquid equilibrium diagram for absorption of diethylene glycol methyl ether (DEGME) solution and a mixed gas of sulfur dioxide and nitrogen at the temperature of 303.15 K, 308.15 K and 313.15 K under the pressure of 122.66 kPa.

The schematic flow diagram of the regeneration by ultrasonic method and/or microwave method or radiation method is shown in FIG. 5. The desulfurization "rich liquor" with absorbed $SO_x$ is charged into an ultrasonic- and/or microwave- or radiation-regenerator and regenerated by ultrasonic irradiation and/or microwave or radiation to release $SO_2$ and/or $SO_3$. The regenerated desulfurization solution by ultrasonic, and/or microwave, or radiation is generally referred to as desulfurization "semi-lean liquor" or "lean liquor". The "semi-lean liquor" or "lean liquor" can be transferred directly to the desulfurization and absorption process to be used repeatedly. Alternatively, it can be transferred to another regenerator for further regeneration by another regeneration method and then transferred to the desulfurization and absorption process to be used repeatedly.

The regeneration process according to the present invention can adopt two or more of the heating method, vacuum method, gas stripping method, ultrasonic method, microwave method, and radiation method described above in one regenerator.

When the regenerated modified polyethylene glycol solution has relatively high water content and the desulfurization effects are influenced, it is needed to remove water from the modified polyethylene glycol solution. The methods for removing water include distillation method by heating, absorption method with water absorbent or combination thereof. The modified polyethylene glycol solution with water removed is recycled for use.

The desulfurization solution of the modified polyethylene glycol solution according to the invention can be consisted of a modified polyethylene glycol solution having a single molecular weight, or a mixed solution of various modified polyethylene glycols having different molecular weights. In order to adjust the polarity of the modified polyethylene glycol solution according to the invention to a suitable state, a certain amount of ethylene glycol, polyethylene glycol or a mixture of ethylene glycol and polyethylene glycol can be added to the modified polyethylene glycol solution. The ethylene glycol, polyethylene glycol or the mixture of ethylene glycol and polyethylene glycol is present in the modified polyethylene glycol solution in a content of less than 20% (mass content). In order to improve the capability of the modified polyethylene glycol solution to absorb sulfur, a certain amount of additives can be added to the modified polyethylene glycol solution according to the invention. The additives can be organic amines, alcohol amines, amides, sulfones, sulfoxides, sodium alkoxides, potassium alkoxides, metal carboxylates, and metallorganic compounds. The organic amines include alkylamines (for example aliphatic amines such as methylamine, ethylamine, propylamine, and butylamine). The alcohol amines include monomethanol amine, dimethanol amine, trimethanol amine, monoethanol amine, diethanol amine, triethanol amine, monopropanol amine, dipropanol amine, tripropanol amine, monobutanol amine, dibutanol amine, tributanol amine and the like. The aromatic amines include phenylamine, phenylenediamine and the like. The amides include formylamide, acetamide, DMF, MDEA and the like. The sulfones and sulfoxides include dimethyl sulfone, diethyl sulfone, dipropyl sulfone, dibutyl sulfone, bis-hydroxyethyl sulfone and the like, dimethyl sulfoxide (DMSO), diethyl sulfoxide, dipropyl sulfoxide, dibutyl sulfoxide and the like. The sodium alkoxides include ethylene glycol sodium, propylene glycol sodium, propanetriol sodium and the like. The potassium alkoxides include ethylene glycol potassium, propylene glycol potassium, propanetriol potassium and the like. The metal carboxylates include transition metal carboxylates and the like. The metallorganic compounds include transition metallorganic compounds and the like. One, two or more of the additives described above can be added to the modified polyethylene glycol solution. The additives are present in the modified polyethylene glycol solution in a content of less than 20% (mass content).

Compared with the conventional wet desulfurization process (for example calcium desulfurization process, and amine desulfurization process), the invention has the following advantages. (1) The conventional wet desulfurization process can only be applied to the desulfurization of gas having relatively low sulfur content. The desulfurization method by modified polyethylene glycol according to the invention can be applied to the desulfurization of gas having low sulfur content and gas having high sulfur content. (2) For the conventional wet desulfurization process, insoluble precipitate of calcium salt or ammonium salt will be produced during the whole process of desulfurization and regeneration, causing equipments and pipes to be clogged. For the desulfurization method by modified polyethylene glycol according to the invention, there is substantially no insoluble precipitate of calcium salt or ammonium salt. (3) For the conventional wet desulfurization process used for removing sulfur from flue gas, the by-products are calcium sulfate and calcium sulfite, or ammonium sulfate and ammonium sulfite. For the desulfurization method by modified polyethylene glycol according to the invention, the by-products are sulfur dioxide and/or sulfur trioxide of high purity, which have broad markets and significant applications as important chemical raw materials. (4) For our earlier patent techniques of "Method for removing $SO_x$ from gas by polyethylene glycol (Patent No. ZL200910009058.1)" and "Method for removing $SO_x$ from flue gas by ethylene glycol (Patent No. ZL200710110446.X)", some of sulfinates and sulfonates will be produced during operation, such that the capability of the solution to absorb sulfur decreases, and the solution deteriorates, thereby damaging the system and even making the system unworkable. For the desulfurization method by modified polyethylene glycol according to the invention, sulfinates and sulfonates will not be produced in the solution during operation, and the solution will not deteriorate. Therefore, the solution is stable and thus the operation is stable. In addition, according to the desulfurization method by modified polyethylene glycol of the invention, the sulfur in gas can be purified sufficiently and the total sulfur content in gas can be steadily decreased to 50 $mg/m^3$ or less. Further, the running cost is low, the operating period is short, the investment is low and the operation is simple.

The desulfurization method by modified polyethylene glycol according to the invention has broad industrial applications and can be used for desulfurization of flue gas, burning gas, coke-oven gas, synthesis waste gas from dyestuff plants, sewage gas from chemical fiber plants, and other industrial raw material gases or waste gases containing $SO_x$. The total sulfur content in the above gases containing sulfur is less than 99.9% (volume percent).

DETAILED DESCRIPTION

The desulfurization method by modified polyethylene glycol according to the invention is described below with reference to some specific embodiments. The embodiments described hereinafter are only for better illustrating the present invention rather than limiting the claims of the present invention.

The first process is a desulfurization and absorption process as shown in FIG. 1. The gas containing $SO_x$ (2) is fed from the bottom of the desulfurization tower (1) and contacted with the desulfurization lean liquor (4) countercurrently. The $SO_x$ in the gas containing $SO_x$ (2) is absorbed by the lean liquor (4). The gas containing $SO_x$ (2) is converted into purified gas (3) which is discharged out from the top of the desulfurization tower (1). The desulfurization lean liquor (4) with absorbed $SO_x$ is converted into desulfurization rich liquor (5) at the bottom of the desulfurization tower (1). The desulfurization rich liquor(5) is discharged out from the bottom of the desulfurization tower (1) and transferred to the regenerator to be regenerated by one or more of heating method, vacuum method, gas stripping method, ultrasonic method, microwave method, and radiation method.

According to FIG. 1, the content of sulfur dioxide in the gas is measured by gas chromatography, and the content of sulfur dioxide in liquid phase is measured by iodometry. The absorption equilibrium is studied when some modified polyethylene glycol (also referred to as "ethylene glycol derivatives") solutions, such as ethylene glycol dimethyl ether (EGDME), diethylene glycol dimethyl ether (DEGDME), triethylene glycol dimethyl ether (TriEGDME), tetraethylene glycol dimethyl ether (TetraEGDME), dioxane (1,4-Dioxane), ethylene glycol methyl ether (EGME), and diethylene glycol methyl ether (DEGME), are contacted with a mixed gas of sulfur dioxide and nitrogen under the pressure of 122.66 kPa at different temperatures (303.15 K, 308.15 K and 313.15 K). The absorption equilibrium data is shown in table 1.

TABLE 1

Gas-liquid equilibrium data for some ethylene glycol derivatives
GLE for EG Derivatives at 122.66 kPa and Different Temperatures

| | T = 303.15 K | | T = 308.15 K | | T = 313.15 K | |
|---|---|---|---|---|---|---|
| | $C_{SO2}$ (mol·m$^{-3}$) | $p_{SO2}$ (Pa) | $C_{SO2}$ (mol·m$^{-3}$) | $p_{SO2}$ (Pa) | $C_{SO2}$ (mol·m$^{-3}$) | $p_{SO2}$ (Pa) |
| EGDME ethylene glycol dimethyl ether | 3.98 | 17.5 | 3.21 | 21.3 | 2.07 | 19.6 |
| | 8.12 | 31.8 | 5.69 | 31.2 | 3.47 | 27.4 |
| | 10.87 | 43.4 | 8.28 | 41.9 | 8.90 | 50.6 |
| | 15.11 | 60.1 | 12.26 | 58.6 | 11.59 | 62.6 |
| | 19.61 | 75.3 | 16.82 | 76.2 | 14.33 | 77.5 |
| | 24.84 | 94.3 | 21.94 | 101.4 | 17.08 | 93.7 |
| | | | | | 6.31 | 40.5 |
| DEGDME diethylene glycol dimethyl ether | 1.91 | 10.7 | 1.81 | 11.3 | 1.81 | 16.0 |
| | 2.62 | 14.1 | 2.59 | 14.0 | 3.36 | 30.0 |
| | 8.30 | 39.9 | 8.85 | 45.9 | 5.54 | 49.6 |
| | 14.59 | 69.4 | 10.92 | 54.9 | 5.95 | 53.4 |
| | 21.68 | 101.6 | 13.25 | 69.4 | 7.76 | 66.6 |
| | 20.87 | 95.4 | 15.84 | 83.5 | 10.09 | 89.6 |
| | 10.66 | 51.9 | 18.94 | 101.5 | | |
| TriEGDME triethylene glycol dimethyl ether | 2.59 | 13.6 | 2.74 | 13.1 | 1.45 | 10.9 |
| | 3.83 | 18.5 | 5.07 | 25.8 | 4.50 | 33.1 |
| | 6.57 | 31.2 | 7.14 | 36.2 | 10.82 | 71.3 |
| | 10.35 | 48.4 | 10.25 | 50.8 | 13.87 | 92.6 |
| | 15.78 | 75.8 | 13.87 | 70.6 | 8.38 | 58.2 |
| | 21.48 | 105.1 | 21.37 | 106.2 | 7.14 | 49.4 |
| TetraEGDME tetrathylene glycol dimethyl ether | 4.14 | 23.1 | 1.14 | 13.2 | 1.60 | 15.3 |
| | 6.31 | 33.4 | 2.17 | 19.5 | 6.78 | 50.2 |
| | 7.87 | 43.7 | 6.16 | 39.8 | 4.71 | 39.8 |
| | 10.97 | 57.2 | 10.35 | 63.3 | 8.49 | 64.5 |
| | 14.33 | 70.7 | 12.94 | 76.3 | 12.63 | 92.9 |
| | 19.87 | 93.1 | 17.44 | 95.2 | 3.67 | 31.0 |
| | 0.88 | 11.5 | 8.02 | 50.0 | 11.18 | 82.3 |
| 1,4-Dioxane dioxane | 7.88 | 28.1 | 4.91 | 18.8 | 0.62 | 10.4 |
| | 13.91 | 49.6 | 7.98 | 34.0 | 1.91 | 15.0 |
| | 16.56 | 60.5 | 10.94 | 46.6 | 4.14 | 25.5 |
| | 20.74 | 72.1 | 11.10 | 48.8 | 6.83 | 38.6 |
| | 23.89 | 80.7 | 14.14 | 61.7 | 11.90 | 65.4 |
| | 27.01 | 89.1 | 16.71 | 70.4 | 14.49 | 79.8 |
| | 29.84 | 96.9 | 19.96 | 79.5 | 18.22 | 97.3 |
| | 34.57 | 104.9 | 26.67 | 98.0 | | |
| | | | 31.40 | 118.2 | | |
| EGME ethylene glycol methyl ether | 2.85 | 19.4 | 2.07 | 20.6 | 1.29 | 19.9 |
| | 5.69 | 33.2 | 4.55 | 38.6 | 2.74 | 30.8 |
| | 8.95 | 51.1 | 8.18 | 63.0 | 4.92 | 49.6 |
| | 13.04 | 74.1 | 9.68 | 71.3 | 7.87 | 72.4 |
| | 15.53 | 88.4 | 14.39 | 101.1 | 9.47 | 86.9 |
| | 19.51 | 106.3 | 6.62 | 52.9 | 6.57 | 62.2 |
| | 10.97 | 62.5 | 12.21 | 89.7 | 12.68 | 107.7 |

TABLE 1-continued

Gas-liquid equilibrium data for some ethylene glycol derivatives
GLE for EG Derivatives at 122.66 kPa and Different Temperatures

| | T = 303.15 K | | T = 308.15 K | | T = 313.15 K | |
|---|---|---|---|---|---|---|
| | $C_{SO2}$ (mol · m$^{-3}$) | $p_{SO2}$ (Pa) | $C_{SO2}$ (mol · m$^{-3}$) | $p_{SO2}$ (Pa) | $C_{SO2}$ (mol · m$^{-3}$) | $p_{SO2}$ (Pa) |
| DEGME | 2.07 | 20.7 | 0.26 | 7.3 | 0.52 | 8.4 |
| diethylene glycol | 4.81 | 34.9 | 4.40 | 36.0 | 1.71 | 20.6 |
| methyl ether | 8.12 | 51.0 | 6.37 | 53.1 | 3.62 | 36.4 |
| | 10.51 | 68.4 | 8.64 | 70.5 | 6.88 | 69.4 |
| | 12.68 | 81.5 | 11.90 | 90.0 | 9.83 | 89.6 |
| | 17.08 | 100.9 | 1.76 | 18.1 | 5.43 | 56.1 |
| | 6.57 | 42.4 | 10.61 | 83.1 | 12.94 | 114.4 |

The data shown in table 1 are plotted to the gas-liquid equilibrium diagrams shown in FIG. 6-12.

From the experiment results described above, it can be seen that the modified polyethylene glycol solution has a strong capability to absorb sulfur dioxide, and is a relatively desirable desulfurization solvent. The capability of the modified polyethylene glycol solution to absorb sulfur dioxide will increase as the absorption pressure increases, and will decrease as the absorption temperature decreases. Therefore, regeneration can be easily carried out by decreasing pressure and increasing temperature so as to recycle the solution.

The second process is the regeneration process of desulfurization solution. The regeneration methods for it include heating method, vacuum method, gas stripping method, ultrasonic method, microwave method, and radiation method.

The regeneration method by heating is shown in FIG. 2. The desulfurization rich liquor (5) is tranferred to the heating-regenerator (6) and is heated to release gaseous sulfur dioxide and/or sulfur trioxide (7). The gaseous sulfur dioxide and/or sulfur trioxide (7) are processed into by-products of liquid sulfur dioxide and/or sulfur trioxide of high purity. Meanwhile, sulfur foams and/or dusts (8) may be produced or accumulated, and are separated from the desulfurization solution. The separated sulfur foams and/or dusts (8) can be further processed into sulfur by-products, and there are also some ash residues discharged. The desulfurization rich liquor (5) is regenerated by heating-regenerator (6) and is then converted into the desulfurization lean liquor (4). The desulfurization lean liquor (4) can be transferred directly to the desulfurization and absorption process for recycle use. Alternatively, it can be transferred to the vacuum-regenerator and/or gas stripping-regenerator, and/or ultrasonic-regenerator, and/or microwave-regenerator, and/or radiation-regenerator to be further regenerated.

The regeneration method by vacuum is shown in FIG. 3. The desulfurization rich liquor (5) is tranferred to the vacuum-regenerator (9), vacuum is created with the aid of vacuumizer (10) to release gaseous sulfur dioxide and/or sulfur trioxide (7). The gaseous sulfur dioxide and/or sulfur trioxide (7) are processed into by-products of liquid sulfur dioxide and/or sulfur trioxide of high purity. Meanwhile, sulfur foams and/or dusts (8) may be produced or accumulated, and are separated from the desulfurization solution. The separated sulfur foams and/or dusts (8) can be further processed into sulfur by-products, and there are also some ash residues discharged. The desulfurization rich liquor (5) is regenerated by vacuum-regenerator (9) and is then converted into the desulfurization lean liquor (4). The desulfurization lean liquor (4) can be transferred directly to the desulfurization and absorption process for recycle use. Alternatively, it can be transferred to the heating-regenerator and/or gas stripping-regenerator, and/or ultrasonic-regenerator, and/or microwave-regenerator, and/or radiation-regenerator to be further regenerated.

The regeneration method by gas stripping is shown in FIG. 4. The desulfurization rich liquor (5) is transferred to the gas stripping-regenerator (11), and contacted counter-currently with the inert gas (12) (including nitrogen, argon and water vapour, etc.) from the bottom of the gas stripping-regenerator (11). The sulfur dioxide and/or sulfur trioxide in the desulfurization rich liquor (5) are released into the inert gas and a mixed gas (13) of sulfur dioxide and/or sulfur trioxide with high concentration is formed and discharged from the top of the gas stripping-regenerator (11). The discharged sulfur dioxide and/or sulfur trioxide in the inert gas are processed into by-products of liquid sulfur dioxide and/or sulfur trioxide of high purity. The desulfurization rich liquor (5) is regenerated by the gas striping-regenerator (11) and is then converted into the desulfurization lean liquor (4). The desulfurization lean liquor (4) can be transferred directly to the desulfurization and absorption process for recycle use. Alternatively, it can be transferred to the heating-regenerator and/or vacuum-regenerator, and/or ultrasonic-regenerator, and/or microwave-regenerator, and/or radiation-regenerator to be further regenerated.

The regeneration by ultrasonic method, and/or microwave method, and/or radiation method is shown in FIG. 5. The desulfurization rich liquor (5) is transferred to the ultrasonic-, and/or microwave-, and/or radiation-regenerator (14) and regenerated under the conditions of ultrasonic, and/or microwave, and/or radiation to release gaseous sulfur dioxide and/or sulfur trioxide (7). The gaseous sulfur dioxide and/or sulfur trioxide (7) are processed into by-products of liquid sulfur dioxide and/or sulfur trioxide of high purity. Meanwhile, sulfur foams and/or dusts (8) may be produced or accumulated, and are separated from the desulfurization solution. The separated sulfur foams and/or dusts (8) can be further processed into sulfur by-products, and there are also some ash residues discharged. The desulfurization rich liquor (5) is regenerated by ultrasonic-, and/or microwave-, and/or radiation-regenerator (14) and is then converted into the desulfurization lean liquor (4). The desulfurization lean liquor (4) can be transferred directly to the desulfurization and absorption process for recycle use. Alternatively, it can be transferred to the heating-regenerator, and/or vacuum-regenerator, and/or gas stripping-regenerator to be further regenerated.

When the regenerated modified polyethylene glycol solution has relatively high water content and the desulfurization effects are influenced, it is needed to remove water from the modified polyethylene glycol solution. The methods for removing water include distillation method by heating, absorption method with water absorbent or combination thereof. The modified polyethylene glycol solution with water removed is recycled for use. The commonly used water absorbents include CaO, anhydrous $CaSO_4$, silica gel and water absorbent resins.

What is claimed is:

1. A method for removing $SO_x$ from a gas, comprising: contacting a modified polyethylene glycol solution with the gas containing $SO_x$ to absorb the $SO_x$ in the gas, wherein x=2 and/or 3, wherein the modified polyethylene glycol is a product derived from etherifying hydroxyl groups in the molecules of ethylene glycol and/or polyethylene glycol and has a general formula:

wherein n is a positive integer, $R_1$ and $R_2$ are the same or different and are each independently alkyl, alkenyl, alkynyl, acyl, or aryl, wherein the modified polyethylene glycol solution is an aqueous solution of modified polyethylene glycol, and the modified polyethylene glycol has a mass percent content of ≥80%.

2. The method for removing $SO_x$ from a gas according to claim 1, wherein the alkyl is C1-C18 linear or branched alkyl; the alkenyl is C2-C18 linear or branched alkenyl; the alkynyl is C2-C18 linear or branched alkynyl; the acyl is wherein R represents C1-C16 linear or branched alkyl, C2-C16 linear or branched alkenyl, or C2-C16 linear or branched alkynyl; and the aryl is phenyl or substituted phenyl.

3. The method for removing $SO_x$ from a gas according to claim 1, wherein the modified polyethylene glycol solution is a solution of modified polyethylene glycol having a single molecular weight, or a mixed solution of a plurality of modified polyethylene glycols having different molecular weights.

4. The method for removing $SO_x$ from a gas according to claim 1, wherein the modified polyethylene glycol solution further comprises ethylene glycol, or polyethylene glycol, or a mixture of ethylene glycol and polyethylene glycol, in a mass percent content of less than 20% of a total mass of the modified polyethylene glycol solution.

5. The method for removing $SO_x$ from a gas according to claim 1, wherein the modified polyethylene glycol solution comprising a plurality of additives selected from the group consisting of organic amines, alcohol amines, amides, sulfones, sulfoxides, sodium alkoxides, potassium alkoxides, metal carboxylates, and metallorganic compounds, and the plurality of additives are in a mass percent content of less than 20% of a total mass of the modified polyethylene glycol solution.

6. The method for removing $SO_x$ from a gas according to claim 1, wherein the modified polyethylene glycol solution absorbs the $SO_x$ in the gas under atmospheric or increased pressure at an absorption temperature of −20 to 80° C.

7. The method for removing $SO_x$ from a gas according to claim 1, further comprising regenerating the modified polyethylene glycol solution containing the absorbed $SO_x$ by one or more method selected from heating, vacuum, gas stripping, ultrasonic treatment, microwave treatment, and radiation at a regeneration temperature of 0 to 300° C. to release sulfur dioxide and/or sulfur trioxide; and recycling the regenerated modified polyethylene glycol solution.

8. The method for removing $SO_x$ from a gas according to claim 7, further comprising, when the regenerated modified polyethylene glycol solution has a mass percent content of water of more than 20%, removing water from the modified polyethylene glycol solution.

9. The method for removing $SO_x$ from a gas according to claim 1, wherein the gas is a flue gas, a waste gas containing $SO_x$, or an industrial raw material gas.

* * * * *